United States Patent [19]

Bull et al.

[11] 4,263,072

[45] Apr. 21, 1981

[54] METHOD OF MANUFACTURING A LAMP HOUSING

[75] Inventors: Dale L. Bull; Norman A. Rautiola, both of Reed City, Mich.

[73] Assignee: Nartron Corp., Reed City, Mich.; a part interest

[21] Appl. No.: 37,475

[22] Filed: May 9, 1979

Related U.S. Application Data

[62] Division of Ser. No. 940,268, Sep. 7, 1978.

[51] Int. Cl.³ .................... B32B 31/16; B60Q 3/04
[52] U.S. Cl. .................... 156/73.1; 156/245; 156/294; 156/304.2; 264/23; 362/362
[58] Field of Search .................. 156/73.1, 245, 293, 156/294, 304, 580.1, 69, 108, 304.2; 264/23; 362/365, 374, 368, 362

[56] References Cited

U.S. PATENT DOCUMENTS

| 3,586,122 | 6/1971 | Jacke | 156/73.1 |
| 3,806,386 | 4/1974 | Burke et al. | 156/73.1 |
| 3,970,490 | 7/1976 | Raines et al. | 156/73.1 |
| 3,988,191 | 10/1976 | Matsui | 156/304 |

OTHER PUBLICATIONS

Ultrasonic News, vol. 9, No. 2, Oct. 1977, pp. 6, 7, 11, "Ultrasonics in the Automotive Industry."

Primary Examiner—Michael G. Wityshyn
Attorney, Agent, or Firm—Lon H. Romanski

[57] ABSTRACT

A lamp housing for a lamp assembly, such as, for example, an indicator type, has a main body portion detachably connectable to an associated support, as, for example, an instrument panel of a related vehicle, with such body portion enabling the easy connection thereto of an associated bulb socket structure; a pair of resiliently deflectable arm-like members carried by the body portion cooperate with a flange portion of the housing to contain the associated support therebetween.

5 Claims, 19 Drawing Figures

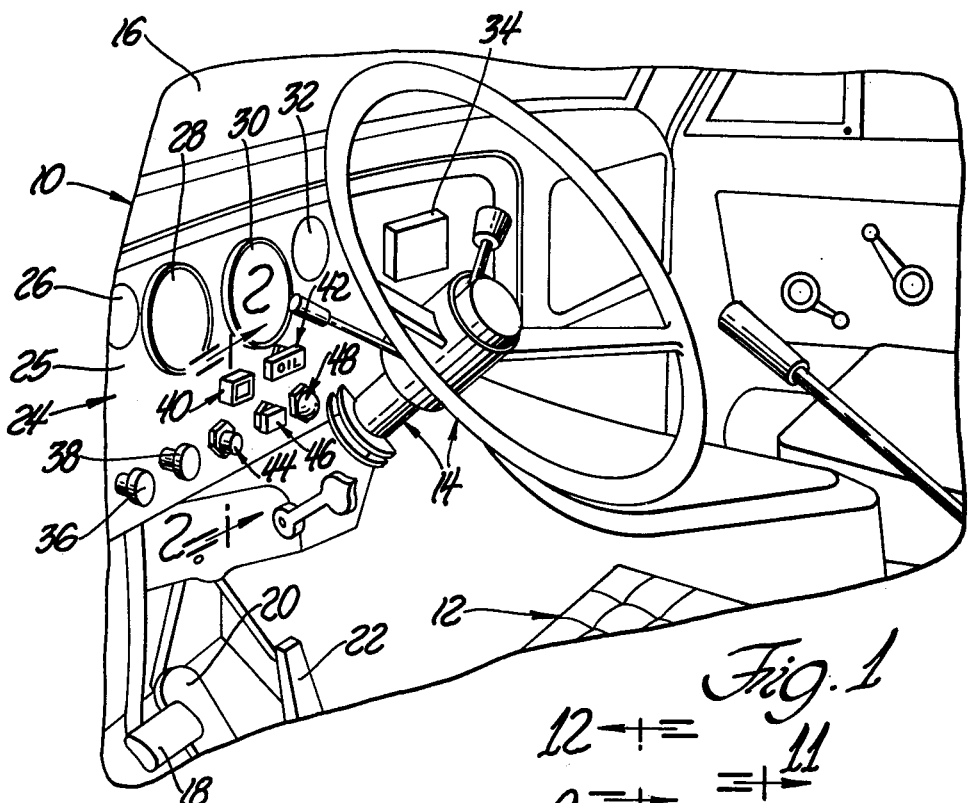
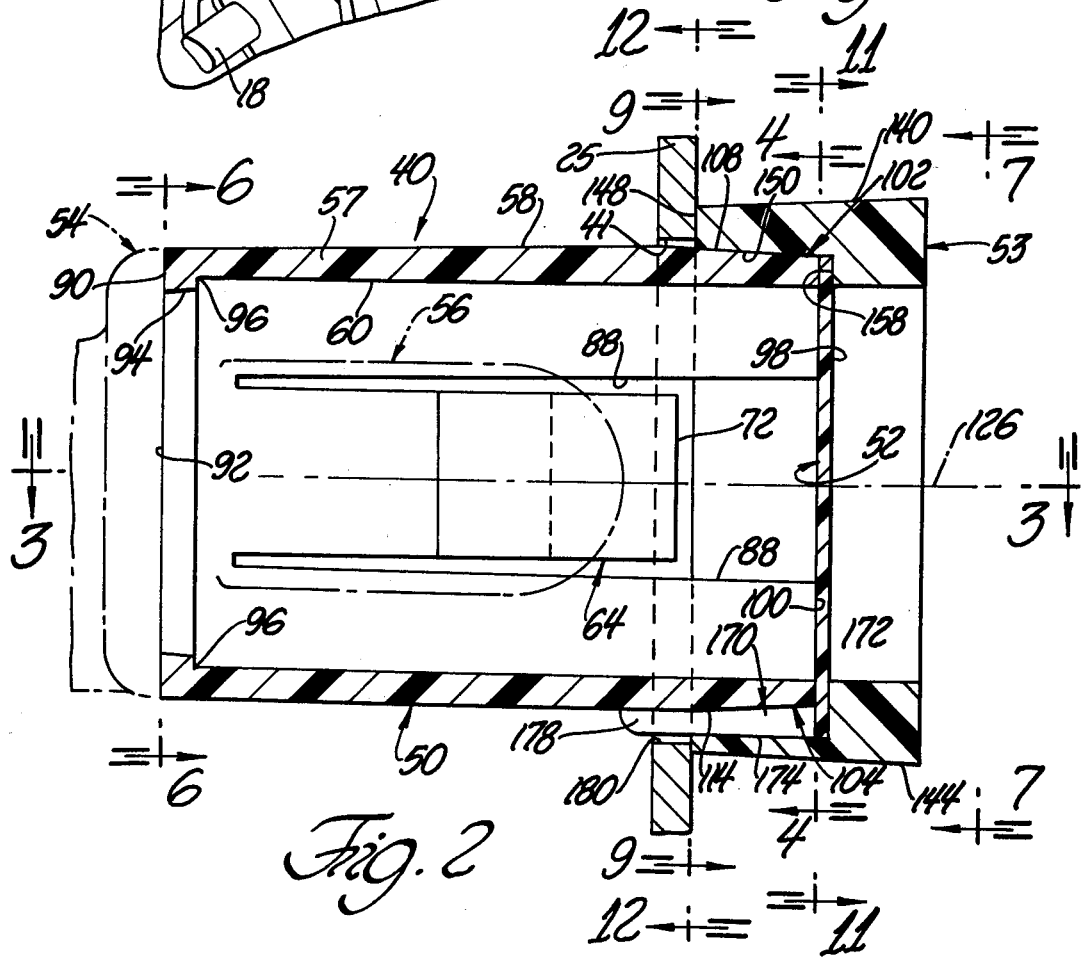

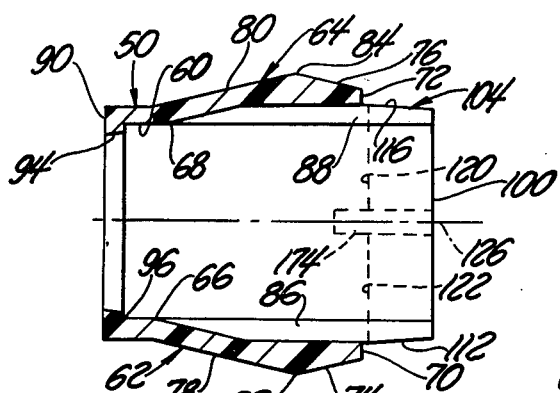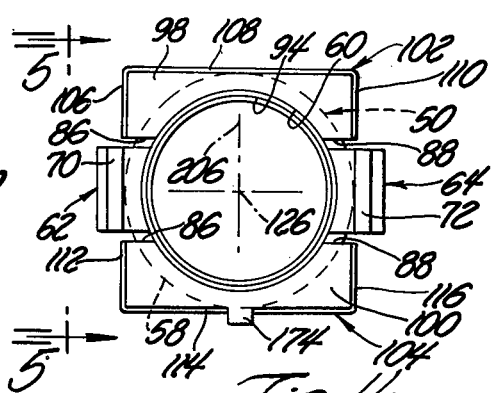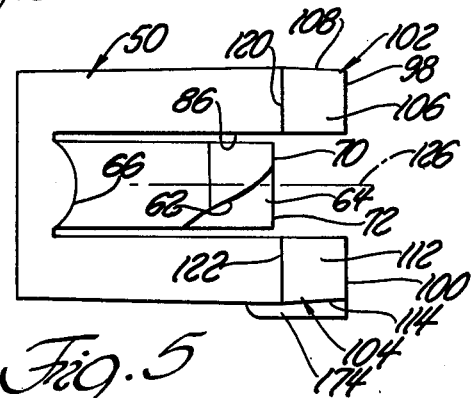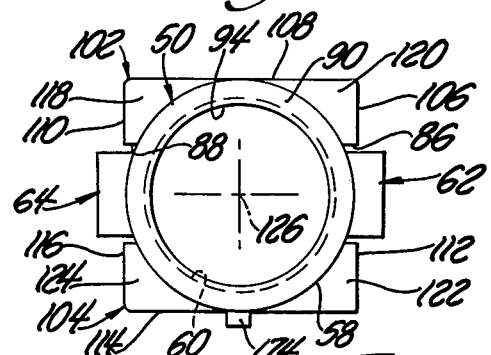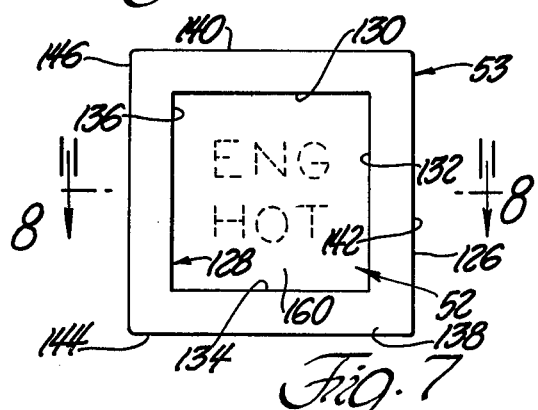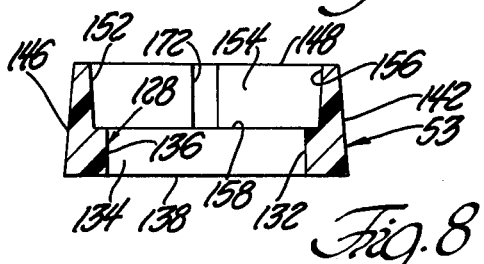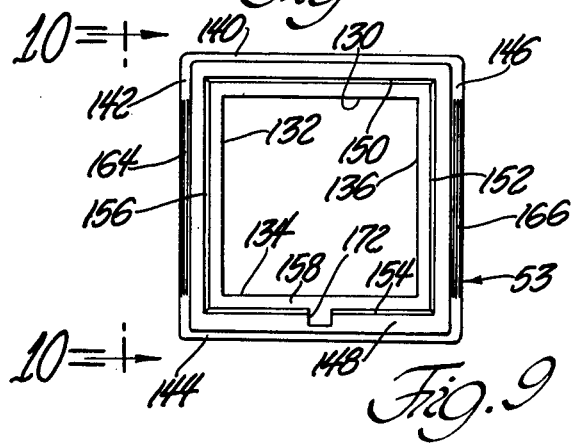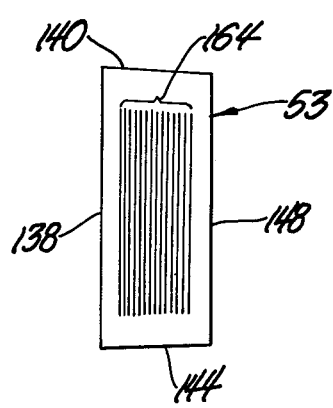

METHOD OF MANUFACTURING A LAMP HOUSING

This is a division of application Ser. No. 940,268, filed Sept. 7, 1978.

BACKGROUND OF THE INVENTION

Generally, in the automotive field, especially with regard to trucks, indicator lamp assemblies are employed to indicate, by their respective energization, that certain selected functions or vehicular operating parameters are in an unacceptable condition. For example, as in a truck, such indicator lamp assemblies may be operatively connected to related sender units which are, in turn, responsive to indicia of: engine oil level; engine temperature; loss of engine coolant; generator or alternator output level; actuation or operation of anti-skid mechanism; air pressure in truck air tanks; headlamp selection (whether high or low beam) or parking brake engagement.

Since trucks represent a comparatively high financial investment and since the only way that a profitable return of such investment can be assured is to keep such trucks in use for as long as possible with as little "downtime" (the time during which the truck is taken out of productive use such as, for example, for maintenance or inspection) as possible, great care is taken to prevent operation of a truck when all important conditions of such truck are judged to be not up to standard as well as to achieve engine shut-down as quickly as possible after the occurrence of a related failure. Such engine shut-down may be called for merely as a preventive or safety measure as, for example, for the prevention of possible damage to the engine or, for example, a progressive loss of air pressure in a truck employing pneumatically actuated brakes.

The truck industry has, heretofore, employed one or more indicator lamp assemblies to thereby create, upon energization thereof, a visual signal to the truck operator that a particular parameter is exhibiting less than satisfactory conditions thereby enabling the operator to take corrective action.

Usually a plurality of such indicator lamp assemblies are employed and mounted as on the vehicular instrument panel. Further, provision is often made so that upon the operator turning the ignition key toward the engine cranking or "start" position, all of the electrical circuits leading to the indicator lamp assemblies are closed thereby causing energization of the lamp assemblies. It is at this time that the operator can see whether all of the lamp assemblies are still functioning or if any bulb replacement is required.

However, various problems have arisen because of the prior art indicator lamp assemblies. For example, certain of the prior art indicator lamp assemblies employ bulbs of a shank length different from the shank length of bulbs employed in other prior art indicator lamp assemblies. This means that in order to provide for all contingencies, the various truck service centers, as well as the truck operator, must carry a supply of all sizes of bulbs since it is possible that bulbs of differing shank sizes will have to be replaced. Obviously, times occur when the particular size of bulb is not available and because of the reluctance of the operator to operate the truck without being assured that the particular related sensed condition is acceptable, additional "downtime" is created in order to properly inspect the related structure.

Further, since energization of an indicator lamp assembly can occur for reasons other than bulb failure, additional problems have been experienced with the prior art indicator lamp assemblies. That is, such non-energization can be the result of a failure within the bulb socket assembly or the electrical conductors leading from the socket assembly to the related source of electrical potential. Because the prior art employed various designs of socket assemblies and because a particular truck instrument panel was effective to receive only one particular design of socket assembly, it has heretofore been necessary that truck service centers (often referred to as "truck stops") maintain a large inventory in order to be able to provide whatever design of socket assembly may be required by any particular truck having that need.

The prior art indicator lamp assemblies have created additional problems also resulting in increased costs. For example, generally it is well known that for various reasons it is desirable to make the cab portion (that part of the truck providing space for the operator and associated controls and instruments) as short in length as possible while still providing adequate space for the operator. Consequently, the space as between the instrument panel and, for example, the forward wall of the cab portion is kept at an absolute minimum with such space being filled with as much related operating equipment, controls, linkages and electrical conductors as is practicably possible.

Because of this compactness of construction of the cab it becomes difficult not only to service, for example, the replacement of bulbs which have failed in the indicator lamp assemblies but also in the actual construction of the cab by the truck builder. That is, almost exclusively the prior art indicator lamp assemblies are such as to require the removal and replacement of the bulb from the rear or underside of the instrument panel and, as already stated, such space is usually very limited.

Generally, the builders of trucks in their manufacturing procedures, more specifically, during assembly of the instrument panel and the subsequent assembling of the completed instrument panel to the cab, require that the indicator lamp assemblies be first assembled to the instrument panel as to comprise a portion of the completed instrument panel before such completed instrument panel is assembled to the cab. This enables the instrument panel to be completed as at a station which is not part of the final assembly of the vehicle.

According to the prior art, the lamp assemblies were thusly assembled. However, because such prior art lamp assemblies were, in the main, constructed of a body-like bulb socket with male type blade terminals carried directly thereby, the assembly of the completed instrument panel onto the cab required the use of intermediate wire harness assemblies which would at one end plug into or onto the blade terminals of the lamp assemblies and, at the other end, plug into terminal ends of a vehicular wiring system which could take the form of a second wiring harness. This meant that not only was the final assembly doubly difficult because of the requirement that each lamp assembly had to have two electrical connections made in order to complete a wiring system thereto, but also the fact that two such terminal sets were used for each lamp assembly doubled the possibility of failure at such terminal points. Also, because of the vary small space behind or below the instrument panel, it is difficult to assure that proper connections are made to the prior art socket assembly because the terminals thereof are situated relatively closely to the rear or under-surface of the instrument panel.

Other problems also exist with respect to the prior art. For example, prior art indicator lamp assemblies often have a lens which is screwed onto the body of the lamp assembly. As is apparent, because of the thread lead, it becomes impossible to both tighten the lens onto the body and at the same time be assured that the lens will assume a particular desired position so that any legend or word (such as, for example, "HOT," "OIL," "AIR") carried by and on such lens is easily readable by the operator. With such prior art lamp assemblies, the lens would have to be tightened and then the lamp body-like socket assembly would have to be turned or rotated until the lens was in a proper attitude at which point the securing means would again be tightened. Such time-consuming operations did not totally correct the problem because even after the lens and body-like socket assembly were initially properly secured during manufacturing and assemblying of the vehicle, the vibrations caused during truck use and consequently experienced by the prior art lamp assembly usually results in the lens becoming loosened as well as the body-like bulb socket assembly rotating within its cooperating mounting aperture in the instrument panel. As is apparent, such vibrations ultimately, and frequently, cause misalignment of the prior art lenses.

Accordingly, the invention as herein disclosed, described and claimed is primarily directed to the solution of such, as well as other related and attendant, problems.

SUMMARY OF THE INVENTION

Apparatus

According to the invention, a lamp housing comprises housing body means, deflectable means carried by said body means for enabling said body means to be detachably secured to associated support structure, said body means having a first end for receiving a lens, said body means having a second open end for detachably receiving therein a portion of an associated bulb socket assembly, and passage means formed in said body means between and interconnecting said first and second open ends, said passage means being adapted to receive therein at least a portion of a bulb operatively connected to and carried by said socket assembly.

Method

According to the invention a method of manufacturing a lamp housing assembly comprises the steps of molding a first longitudinal half of a generally tubular housing body, molding a second longitudinal half of a generally tubular housing body, forming a lens of at least translucent material, molding a lens retainer, securing said first longitudinal half to said second longitudinal half as to form a tubular housing body, placing said lens in juxtaposition with one end of said first and second longitudinal halves and in juxtaposition with said lens retainer, and securing said lens retainer to said first and second longitudinal halves.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purpose of clarity certain details and/or elements may be omitted from one or more views:

FIG. 1 is a fragmentary perspective view of an interior of a truck cab having an instrument panel employing various indicator lamp assemblies including a lamp housing assembly embodying teachings of the invention;

FIG. 2 is an enlarged cross-sectional view, partly in phantom line, taken generally on the plane of line 2—2 of FIG. 1 and looking in the direction of the arrows;

FIG. 3 is a cross-sectional view of relatively reduced scale, of a portion of the structure of FIG. 2, taken generally on the plane of line 3—3 of FIG. 2 and looking in the direction of the arrows;

FIG. 4 is a view of relatively reduced scale, of a portion of the structure of FIG. 2, taken generally on the plane of line 4—4 of FIG. 2 and looking in the direction of the arrows;

FIG. 5 is an elevational view taken generally on the plane of line 5—5 of FIG. 4 and looking in the direction of the arrows;

FIG. 6 is an end elevational view of relatively reduced scale taken generally on the plane of line 6—6 of FIG. 2 and looking in the direction of the arrows;

FIG. 7 is an end elevational view of relatively reduced scale taken generally on the plane of line 7—7 of FIG. 2 and looking in the direction of the arrows;

FIG. 8 is a cross-sectional view taken generally on the plane of line 8—8 of FIG. 7 and looking in the direction of the arrows;

FIG. 9 is a view of relatively reduced scale, of a portion of the structure of FIG. 2, taken generally on the plane of line 9—9 of FIG. 2 and looking in the direction of the arrows;

FIG. 10 is an elevational view taken generally on the plane of line 10—10 of FIG. 9 and looking in the direction of the arrows;

DETAILED DESCRIPTION OF THE PREFERRED EMBODIMENT

Figure 11:
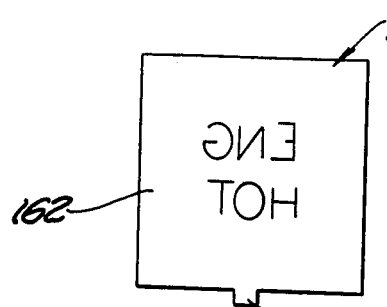
FIG. 11 is an elevational view, of relatively reduced scale, of one of the elements of the structure of FIG. 2 taken generally on the plane of line 11—11 of FIG. 2 and looking in the direction of the arrows.

Referring now in greater detail to the drawings, FIG. 1 illustrates the interior of a truck cab 10 as being comprised of, for example, a driver's or operator's seat assembly 12, steering wheel and column assembly 14, windshield 16, operator's foot actuated levers and pedals 18, 20 and 22, and instrument panel assembly 24 comprising a panel-like support 25 and an array of gauges 26, 28, 30, 32 and 34, controls 36, 38 and a plurality of indicator lamp and housing assemblies 40, 42, 44, 46 and 48.

In FIG. 2, the indicator lamp and housing assembly 40 is illustrated as being comprised of a main body or housing 50, lens 52, lens retainer or bezel 53, bulb socket assembly 54 and cooperating bulb 56, all being suitably secured to and carried as by panel or support 25 of the instrument panel assembly 24.

Referring in particular to FIGS. 2, 3, 4, 5 and 6, in the preferred embodiment of the invention, body or housing 50 is preferably generally tubular having a tubular wall 57 comprised as of an outer generally cylindrical surface 58 of relatively large diameter and an inner generally cylindrical surface 60 of relatively smaller diameter. Formed integrally with the wall 57 are oppositely disposed resiliently deflectable detent like latching arms 62 and 64 respectively joined as at 66 and 68 to wall 57 and, respectively, having free ends 70 and 72. The right-most (as viewed in FIGS. 2, 3 and 5) or forward ends of arms 62 and 64 are provided with generally radially outwardly extending cam-like or ramp-like surface means 74 and 76 as well as oppositely inclined cam-like or ramp-like surface means 78 and 80, respectively. Such oppositely inclined surfaces may join each other as at, for example, respective apexes 82 and 84. As generally depicted by FIGS. 2 and 5, arms 62 and 64 are respectively situated generally within slot-like clearances 86 and 88 formed in the well 57 of housing body 50.

The left end (as viewed in FIGS. 2, 3 and 5) of body or housing 50 terminates as in an axial end surface 90 formed as on a transverse extending wall 92 through which an aperture or passage 94 is formed. The relative dimensions of passage 94 and inner surface 60 are preferably such as to result in a stepped or flange-like annular surface 96. In the preferred embodiment, the aperture or passage 94 may be tapered as to thereby present a relatively larger opening at the inner-most side of wall 92 while presenting a relatively smaller opening at the outermost side of wall 92.

The right-most or forward end of housing or body means 50 is formed as to terminate in end surfaces 98 and 100 which are further defined as by a relatively enlarged bezel or lens retainer mounting portions 102 and 104, respectively. When viewed as in FIGS. 4 or 6, the portions 102 and 104 define a generally square configuration with rectilinear mounting surfaces 106, 108 and 110 formed on portion 102 and rectilinear mounting surfaces 112, 114 and 116 formed on portion 104. Mounting or head-like portions 102 and 104 extend generally axially or longitudinally and terminate as in wall-like surfaces 118, 120, 122 and 124. As depicted in FIGS. 2, 3, 4 and 5, mounting surfaces 106, 108, 110, 112, 114 and 115 are preferably inclined with respect to each other as to generally be closer to the axis 126 the more nearly such surfaces approach end surfaces or faces 98 and 100. In the preferred embodiment surfaces or end faces 98 and 100 are substantially coplanar with each other and opposed end faces or surfaces 118, 120, 122 and 124 are also substantially coplanar with each other.

In the preferred embodiment, the housing is comprised of plastic material such as, for example, short glass fiber filler nylon type 66. (Nylon 66 is a condensation product of adipic acid and hexamethylenediamine. Adipic acid is obtained by catalytic oxidation of cyclohexane.)

Referring now in greater detail to FIGS. 2, 7, 8, 9 and 10, the bezel 53 is illustrated as comprising a generally rectangular or square frame-like body 126 with an inner opening 128 defined as by surfaces 130, 132, 134 and 136 which, at the forward most ends, terminate in the forward or end face surface 138 of body 126. The outer periphery of body 126 is defined as by rectilinear surfaces 140, 142, 144 and 146 which extend from the forward-most end surface 138 to the rearward-most end surface 148. The body 126 is further provided with internal rectilinear surfaces 150, 152, 154 and 156 which, at their respective inner-most ends, terminate as in a transverse wall portion 158 and, at their respective other ends, terminate in end surface 148. As depicted in each of FIGS. 2, 8 and 9 the inner surfaces 150, 152, 154 and 156 are inclined with respect to each other as to be at angles complementary to the inclinations of surfaces 108, 106–112, 114 and 116–110, respectively, of mounting portions 102 and 104 of housing body 50.

Also, in the preferred embodiment, at least surfaces 142 and 146 are respectively provided with textured surface portions 164 and 166 as to thereby further enhance the gripping qualities thereof, as will be more fully described.

The lens 52, shown in FIGS. 2, 7 and 11, in its preferred embodiment, comprises translucent polycarbonate sheet-like material and has its forward-most or outer face 160 treated as to be of a generally frosted surface. Further, preferably, a suitable legend such as, for example, "ENG HOT," is formed on or carried by the rear or inner face of 162 of the lens. The legend, in FIG. 7, is depicted in hidden line since, in the preferred embodiment, because of the frosted forward or outer surface 160, the legend would normally not be visible until such time as the bulb 56 is energized.

As best seen in FIG. 11, the lens 52 is also preferably of a square configuration. The lens 52 is received generally within bezel or lens retainer means 53 in a manner whereby a generally outer portion of forward or outer surface 160 of lens 53 is in abutting engagement with abutment or wall surface 158 of bezel 53. The bezel 53 and lens 52 are then assembled onto and suitably secured to housing body 50, as generally depicted in FIG. 2, resulting in lens 52 being axially contained as between the surfaces 98 and 100 of body means 50 and wall or abutment surface means 158 of bezel or retainer means 53. The retainer means 53 may be operatively secured to portions 102 and 104 of housing means 50 by any number of suitable securing means. However, in the preferred embodiment, once the bezel means 53 and lens means 52 are assembled onto housing means 50, the retainer means 53 is secured to housing means 50 by sonic welding as through those portions of retainer means 53 disposed generally between surface 140 and surface 108 of portion 102 and generally between surface 144 and surface 114 of portion 104. Obviously, in view of the teachings, it should be apparent that such attachment may be accomplished as with suitable adhesives, cements and even mechanical interlock means.

In any event when the lens retainer means or framing means 53 is suitably secured to housing 50, the resulting assembly 40 may be inserted as into an aperture 41, formed in panel or support 25, as by first introducing the left-most end of housing means 40 into aperture 41, and progressively pushing and moving the housing means 40 to the left (as viewed in FIG. 2). Such progressive leftward movement causes the surface of aperture 41 to first engage ramp surfaces 78 and 80 of arms 62 and 64 causing such arms 62 and 64 to be progressively deflected inwardly toward the axis 126 as viewed, for example, in FIG. 3. Such deflection of arms 62 and 64 continues until such time as when the housing means 40 is moved to the left sufficiently to cause the apexes 82 and 84 of arms 62 and 64 to pass beyond the confines of aperture 41. When this happens, further leftward movement of housing means 40 results in arms 62 and 64 moving, resiliently, outwardly with such outward movement being determined by the continuing engagement between aperture 41 and ramp or cam surfaces 74 and 76. When the housing means 40 is moved sufficiently leftward, end or wall surfaces 118, 120, 122 and 124 abut against panel or support 25 and prevent further leftward movement of housing assembly 40. At this time, the resilient force of arms 62 and 64 along with the inclinations of surfaces 74 and 76 become sufficient to hold the housing assembly 40 in its mounted or assembled condition with respect to panel 25, as generally depicted in FIG. 2. In the preferred embodiment, the effective axial length of retainer or bezel means 53 is such that the surface 148 thereof is forwardly of or coplanar with surfaces 118, 120, 122 and 124. If any excessive loads, forces or impacts are to be experienced, it is preferred that such be transmitted into the body portions 102 and 104 directly through surfaces 118, 120, 122 and 124 and not into surface 148 and through body 138.

The preferred embodiment of the invention also comprises gating or indexing means. Such gating or keying means 170 may be comprised of a generally longitudinally extending slot or groove 172 formed, generally, as in the inner surface 154 of retainer or frame means 53 (FIGS. 2, 8 and 9) and a cooperating key-like extension 174 formed on or carried by housing body 50 (FIGS. 2, 3, 4, 5 and 6). Further, in the preferred embodiment, the lens 52 is also provided with a key-like portion or tang 176 which is also slidably received within the groove or guide 172 thereby limiting the relative position which lens 52 may assume when assembled to or received by the retainer 53.

Figure 12:
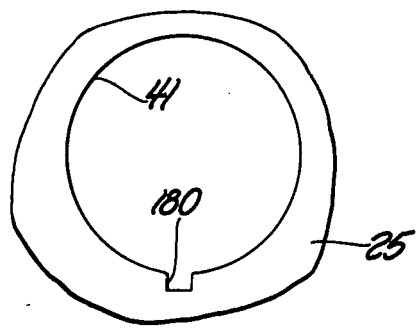
FIG. 12, is a view of relatively reduced scale taken generally on the plane of line 12—12 of FIG. 2 illustrating the panel mounting aperture of FIG. 2.

As best depicted in FIG. 2, the effective length of the key portion 174 is substantially longer than the effective length of the coacting groove or slot 172 as to result in a portion 178 thereof extending beyond groove 172. FIG. 12, fragmentarily illustrates panel or support 25 with mounting aperture 41 formed therethrough. In some arrangements, such apertures are also provided with a key-like slot or recess 180 formed therein. In such instances the projecting or extending portion 178 of key portion 174 is received within key slot 180 and thereby provides a positive mechanical lock against any undesirable rotation of the lamp housing 40 within aperture 41. In those situations where the mounting aperture is not provided with a slot such as 180, and if the preferred embodiment of the invention is employed as the lamp housing, the lamp housing may be mounted to such aperture by either of two expedients. That is, since the preferred embodiment is made of plastic material, it has been determined that the projecting portion 178 of key 174 can be cut or broken off as by, for example, grasping that portion with pliers or the like and simply twisting off such grasped portion thereby permitting the lamp housing 40 to be fully inserted into the cooperating mounting aperture to a position as depicted in FIG. 2. The other expedient comprises the use of a suitable spacer which could approximate the projected configuration of surface 148 (FIG. 9) and be of a length generally equal to or slightly greater than the length of the projecting portion 178 of key 174. If such a spacer were employed, it would be slipped over housing body 50 and against surface 148 prior to lamp housing 40 being introduced into the mounting aperture.

Figure 13:
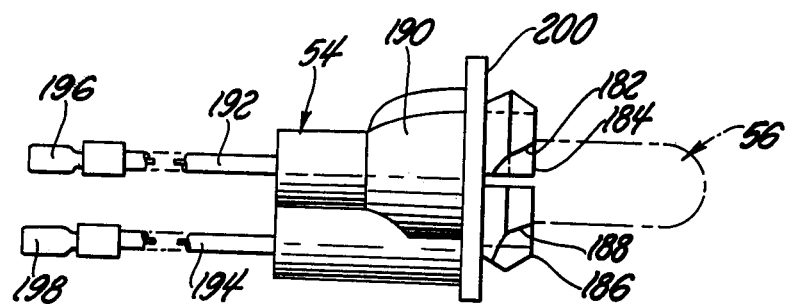
FIG. 13 is a side elevational view of a bulb socket assembly, fragmentarily illustrated in phantom line in FIG. 2, employable with the invention.

FIG. 13 illustrates, by way of example, a bulb socket assembly 54 employable in the invention. The main portion of the structure of FIG. 13 is of plastic or other suitable electrically non-conductive material. Socket assembly 54 comprises a plurality of resiliently deflectable circumferentially situated arcuate latching members or portions 182, 184, 186 and 188, which may be integrally formed with main body portion 190, and a plurality of extending electrical conductors 192 and 194, with respective terminal members 196 and 198, comprising the wiring harness as to achieve, for example, a remote electrical circuit connection.

As is well known in the art and as already implied, the body or housing 190 of socket assembly 54 may be formed of electrically non-conductive plastic material with a suitable centrally located cylindrical recess formed therein adapted to receive therein the male plug-in portion of the related bulb 56. Further, by way of example, the said male plug-in portion may be of the bayonet lock type wherein a tab carried at the side thereof becomes locked against an electrically conductive member within the bulb-receiving recess while a spring loaded contact at the end of the recess engages the end of the said plug-in portion to thereby complete a circuit with and through bulb 56.

As should now be apparent, when bulb socket assembly 54 is in a disconnected state from housing body 50 all that needs to be done to affect operative connection therebetween is to push the socket assembly 54 against the rear or left open end of housing body 50. In so doing, the forward inclined portions of latching arms or portions 182, 184, 186 and 188 operatively engage the surface of aperture 94 and, upon continued applied force, will resiliently deflect radially inwardly as to thereby generally pass through aperture 94. Once such passage is affected, under their own inherent resilient force, the latching or detent portions or arms 182, 184, 186 and 188 move radially outwardly thereby causing the rearwardly disposed inclined portions or surfaces thereof to respectively engage the effective annular step created internally of housing body 50 by virtue of the shoulder or annular surface 96. The dimensions and configurations of the respective cooperating elements is such as to preferably cause forward end surface 200 of body 190 to be in abutting engagement with housing body end surface 90 prior to latching arms 182, 184, 186 and 188 dissipating all of the inherent resilient force thereby assuring a sound latched engagement as between housing body 50 and socket assembly 54.

The invention enables, for example, the bulb 56 to be changed from either the front or the rear of the support or instrument panel 24. If removal of the bulb 56 is to be affected from the rear, all that has to be done is to exert a slight, preferably oblique, force against the bulb socket assembly 54 and directed generally away from body 50 thereby causing the socket body assembly 54 to become disengaged from housing body 50 while still retaining the bulb 56 in such socket assembly. The bulb can then be replaced in the socket assembly and such again latched to the housing body 50 as previously described. If removal of the bulb is to be affected from the front, the housing assembly 50 is withdrawn, as by manually grasping the opposed textured surfaces 164 and 166 of the forward portion or bezel means 53 and, as viewed in FIG. 2, pulling the assembly 40 rightward out of the mounting aperture 41. In so doing, the bulb socket assembly 54 will also be drawn through and out of aperture 41 thereby enabling disconnection of the socket assembly 54 (and attendant replacement of the bulb carried thereby) to be made in front of the panel or support 25. Thereafter, the socket assembly is again latched to the housing body 50 of assembly 40 and together they are re-introduced into mounting aperture 41 and operatively secured thereto in the manner previously described.

The lamp housing assembly of the invention may be manufactured in any of a number of ways. However, it has been discovered that a particularly beneficial manner or method of manufacture comprises the steps of molding or otherwise forming the several elements and then joining them together into an assembly. More particularly, especially with reference to FIGS. 2, 3, 4 and 14, it is contemplated that the housing body 50 be actually comprised of first and second longitudinally extending molded halves 202 and 204 as to result in, so to speak, a parting or juncture line or plane being the plane of the drawing in FIG. 2 and, in FIG. 4, the vertically extending trace 206 being the parting or juncture plane. The halves 202 and 204 may then be joined to each other as along juxtaposed longitudinal surfaces 208 and 210 and along juxtaposed longitudinal surfaces 212 and 214. The lens 52 may be cut or otherwise formed from suitable material and brought into juxtaposition with end 98 of halves 202 and 204 as well as into juxtaposition with separately molded plastic lens retainer means 53 which, in turn, would be operatively secured to, for example, portions 102 and 104 of the halves 202 and 204.

Further, it has been discovered that such manufacture and assembly can be easily and readily performed by the following steps comprising molding a first longitudinal half, such as 202, of the generally tubular housing 50; molding a second longitudinal half, such as 204, of the generally tubular housing 50; forming a lens, such as 52, of at least translucent material; molding a lens retainer, such as 53; placing the retainer 53 in a suitable fixture as to, for example, be situated having its surface 148 upwardly disposed; placing the lens 52 within the retainer 53 as to rest, for example, against surface 158 thereof; placing the said first longitudinal half 202 into said retainer as to cause surfaces 108, 106, 112 and 114 thereof to be in juxtaposition with surfaces 150, 152 and 154 of retainer 53 while surface portion 98 of half 202 is in juxtaposition with lens 52; placing the said second longitudinal half 204 into said retainer as to cause surfaces 108, 110, 116 and 114 thereof to be in juxtaposition with surfaces 150, 156 and 154 of retainer 53 while surface portion 98 of half 204 is in juxtaposition with lens 52; operatively engaging the sections 202 and 204 as near the swingable ends of arms 62 and 64 and urging such away from each other to assure maximum contact as between juxtaposed surfaces 108, 106, 112, 114, 110, 116 and surfaces 150, 152, 154 and 156; applying sonic wave producing means as to surface 138 of retainer 53 and as to end surface 90; energizing said sonic wave producing means to cause sonic welding as between juxtaposed surfaces of said first and second halves and as between juxtaposed surfaces of said first and second halves and said retainer.

Thus far the invention has been disclosed as having a body with a generally squared or rectilinear end to which a squared or rectilinear retainer is secured. It should be made clear that the invention is not so limited and, among other things, it is specifically contemplated that such end (as comprised of portions 102 and 104) may have any suitable outer configuration as, for example, circular or arcuate, and that the retainer 53 may likewise have a circular outer configuration and/or circular inner configuration.

FIGS. 15, 16, 17, 18 and 19 illustrate yet another embodiment of the invention. Generally, those elements in FIGS. 15-19 which are like or functionally similar to those of FIGS. 1-14 are identified with like reference numerals provided with a suffix "a."

Figure 15:
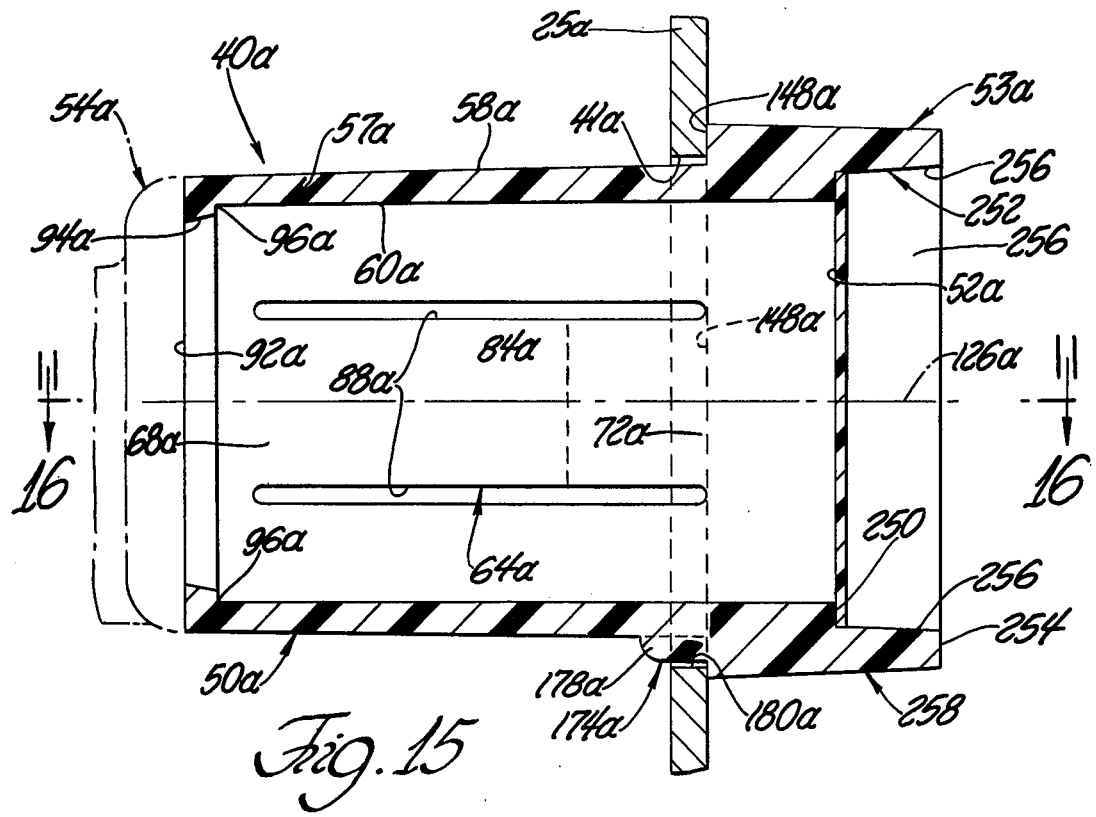
FIG. 15 is a view similar to that of FIG. 2 and illustrating a further embodiment of the invention.
Figure 16:
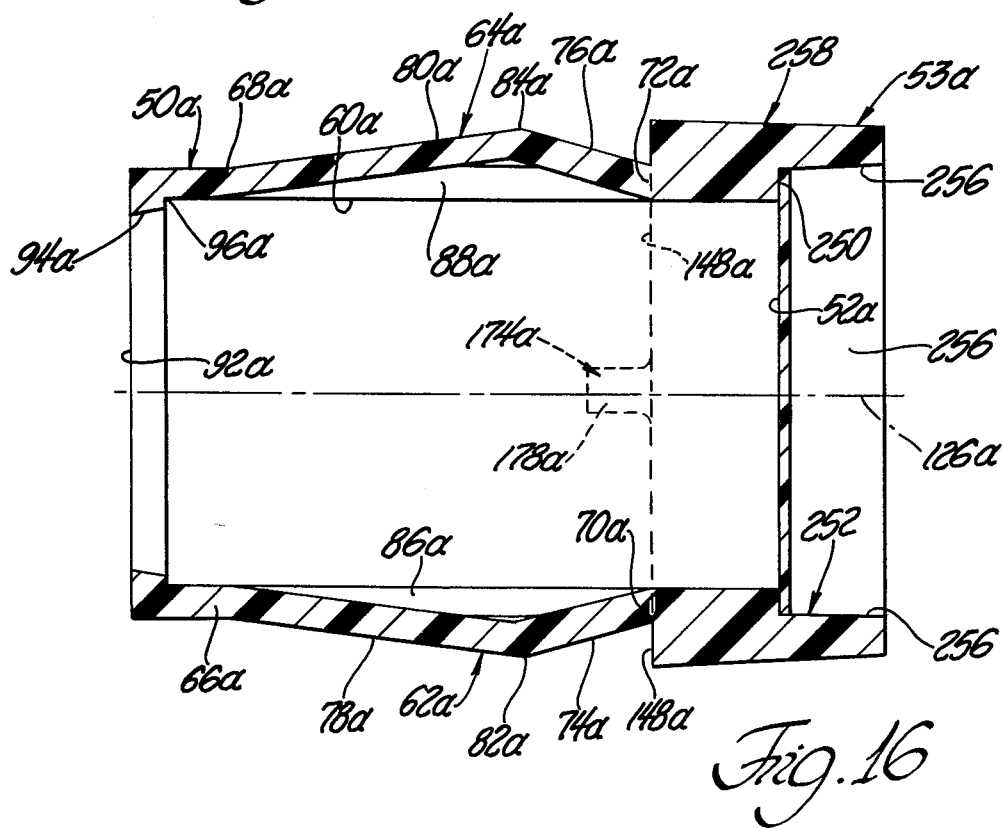
FIG. 16 is a view somewhat similar to that of FIG. 3, taken on the plane of line 16—16 of FIG. 15 and looking in the direction of the arrows.

As can be seen in FIGS. 15 and 16, formed integrally with wall 57a are oppositely disposed resiliently deflectable detent like latching arms 62a and 64a respectively joined, at their one ends, to wall 57a as at portions 66a and 68a and similarly respectively joined, at their opposite ends, to wall 57a as at portions 70a and 72a. The right-most (as viewed in FIGS. 15 and 16) or forward ends of arms 62a and 64a are provided with generally radially outwardly extending cam-like or ramp-like surface means 74a and 76a as well as generally rearwardly disposed oppositely inclined cam-like or ramp-like surface means 78a and 80a, respectively. As generally depicted, in the preferred form of the embodiment of FIG. 15, arms 62a and 64a are respectively situated between opposite slot-like clearances 86a and 88a formed in the wall 57a of housing 50a.

The right-most or forward end of housing or body means 50a is provided with a generally enlarged body portion 53a for carrying a related lens 52a. As can be seen, preferably, passage 60a terminates as in a transversely or radially extending and generally circumscribing surface 250 against which the cooperating lens 52a can be operatively placed. As also illustrated, an opening 252 is provided as from the right or forward-most surface 254 to enable the reception therein of said lens 52a and consequently enable the operative mounting thereof. In the preferred embodiment, opening 252 has its general peripheral surface 256 generally inclined with respect to axis 126a in a manner as to generally be disposed further away from such axis 126a the closer such surface approaches the forward end 254. Also, preferably, the outer surface means 258 of enlarged end portion 53a is tapered or inclined, with respect to axis 126a, in a direction generally opposite to said inner surface means 256.

The left-most or rearward end of enlarged portion 53a is provided with a generally transverse wall 148a which serves as an axial abutment against the associated support 25a. As best seen in FIGS. 15 and 16, the guide or keying means 174a is formed integrally with wall 57a and enlarged portion 53a and serves the same purpose in the same manner as described with reference to FIGS. 1-14.

The lens 52a may be operatively secured to housing means 50a in any suitable manner as, for example, by adhesives or sonic welding.

Figure 17:
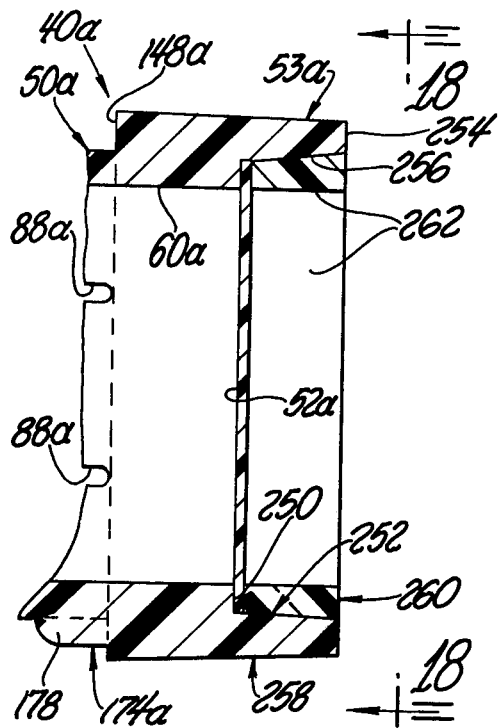
FIG. 17 is a view illustrating, in effect, a fragmentary portion of the structure shown in FIG. 15 and a further modification thereof.
Figure 18:
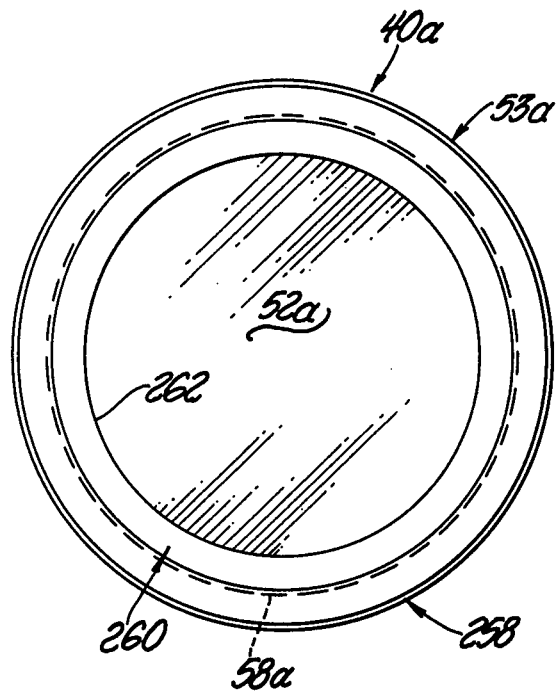
FIG. 18 is a view taken generally on the plane of line 18—18 of FIG. 17, looking in the direction of the arrows and illustrating a possible outer configuration of the structure of FIG. 17.
Figure 19:
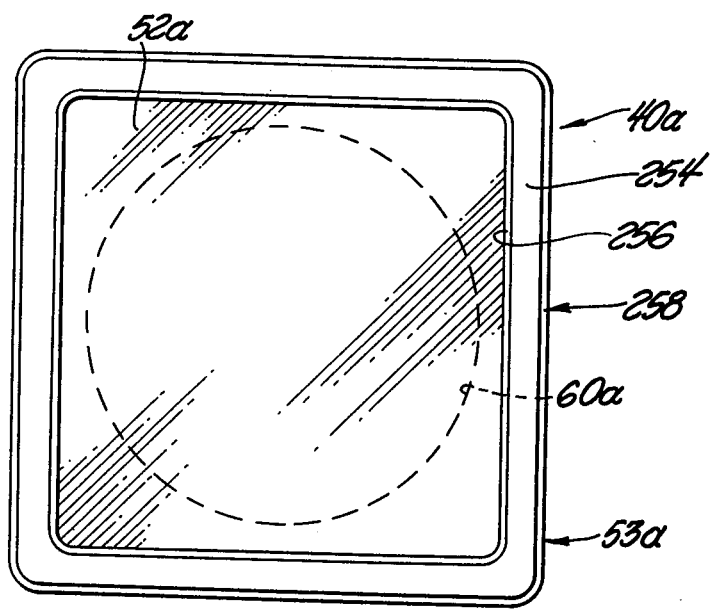
FIG. 19 is a view similar to that of FIG. 18 and illustrating another possible outer configuration.

In FIGS. 17 and 18 all elements which are like or similar to those of FIGS. 15 and 16 are identified with like reference numerals and suffixes, if any. The modification of FIGS. 17 and 18 contemplates the provision of additional bezel-like or lens retaining means 260 which, as illustrated, may have a generally outer surface complementary to inner surface 256. The retainer means may be situated as to mechanically retain the lens 52a in an assembled condition and the retainer means 260, itself, may be suitably secured to the housing enlarged portion 53a as by, for example, adhesives, sonic welding or any other means, as for example, a mechanical interlock. The inner surface 262 of retainer means 260 may be as to form a general continuation of passage 60a; however, both the retainer means 260 and inner surface 262 need not be so limited. That is, FIG. 18 depicts the enlarged portion 53a as being generally arcuate or circular with the retainer means 260 and its inner surface 262 also being circular; however, the enlarged portion 53a may have any other outer configuration such as, for example, rectilinear or generally squared as depicted in FIG. 19 (wherein elements which are like or functionally similar to those of FIGS. 15-18 are identified with like reference numerals and suffixes, if any). In a configuration as depicted in FIG. 19, if a retainer means 260 were to be employed, the outer surface thereof would be complementary to inner surface 256 of FIG. 19 and yet the inner surface 262 of that retainer could be similarly of a square-like configuration or circular as depicted in FIG. 18.

Figure 14:
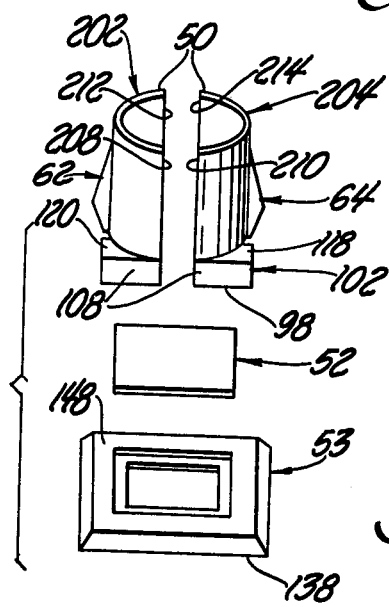
FIG. 14 is a generally exploded view of the elements shown in preceding Figures and somewhat simplified, illustrating, in part, a method of manufacturing the lamp housing assembly.

In the preferred form of the embodiment of FIGS. 15-19, the housing means 50a would be molded of plastic material and, if desired, it could be molded in opposed halves which would be joined to each other generally in accordance with the method set forth and described with regard to FIG. 14.

Although only a preferred embodiment and a select number of modifications of the invention have been disclosed and described, it is apparent that other embodiments and modifications of the invention are possible within the scope of the appended claims.

What is claimed is:

1. A method of manufacturing a lamp housing assembly, comprising the steps of molding a first longitudinal half of a generally tubular housing body, molding a second longitudinal half of a generally tubular housing body, forming a lens of translucent material, molding a lens retainer, longitudinally securing by sonic welding said first longitudinal half to said second longitudinal half as to form a unitary tubular housing body, placing one side of said lens in juxtaposition with one end of said first and second longitudinal halves and placing a second side opposite to said one side of said lens in juxtaposition with said retainer, and by sonic welding securing said retainer to said first and second longitudinal halves.

2. A method according to claim 1 wherein the step of molding said retainer comprises the step of forming a recess in said retainer, and wherein the step of placing said lens in juxtaposition with said retainer comprises the step of placing said lens into said recess.

3. A method according to claim 1 wherein the step of forming said lens comprises the step of treating one side thereof as to have a frosted appearance.

4. A method according to claim 1 wherein the step of forming said lens comprises the step of forming a legend on one side thereof.

5. A method of manufacturing a lamp housing assembly having a generally tubular housing body; comprising the steps of molding a first longitudinal half of said generally tubular housing body as to have a first longitudinal end formed as to be situated generally transversely thereof; molding a second longitudinal half of said generally tubular housing body as to have a second longitudinal end formed as to be situated generally transversely thereof; forming a lens of translucent material; molding a lens retainer; placing the lens retainer in suitable fixture means; placing the lens atop the retainer; placing the first longitudinal half of said generally tubular housing body in said fixture means as to have said first longitudinal end thereof juxtaposed to said lens and said lens retainer; placing the second longitudinal half of said generally tubular housing body in said fixture means as to have said second longitudinal end thereof juxtaposed to said lens and said lens retainer; and applying sonic wave energy to said first and second longitudinal halves and said lens retainer as to cause welding of material to occur longitudinally as between said first and second longitudinal halves, as between said first longitudinal end of said first longitudinal half and said lens retainer and as between said second longitudinal end of said second longitudinal half and said lens retainer.

* * * * *